US009993750B2

(12) United States Patent
Smith et al.

(10) Patent No.: US 9,993,750 B2
(45) Date of Patent: Jun. 12, 2018

(54) CLOG-RESISTANT SERPENTINE PILLAR FILTERS AND BLADED LOADING STRUCTURES FOR MICROFLUIDICS

(71) Applicant: International Business Machines Corporation, Armonk, NY (US)

(72) Inventors: Joshua T. Smith, Croton on Hudson, NY (US); Benjamin H. Wunsch, Mt. Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 141 days.

(21) Appl. No.: 15/071,980

(22) Filed: Mar. 16, 2016

(65) Prior Publication Data

US 2017/0266593 A1 Sep. 21, 2017

(51) Int. Cl.
*B01D 29/44* (2006.01)
*B01D 29/00* (2006.01)

(52) U.S. Cl.
CPC ......... *B01D 29/44* (2013.01); *B01D 29/0093* (2013.01)

(58) Field of Classification Search
CPC ............................ B01D 29/44; B01D 29/0093
See application file for complete search history.

(56) References Cited

U.S. PATENT DOCUMENTS 4,374,798 A * 2/1983 Mercer .................. B29D 28/00 264/288.8
6,454,924 B2 9/2002 Jedrzejewski et al.
7,037,994 B2 5/2006 Sugita et al.
7,217,562 B2 5/2007 Cao et al.
7,303,855 B2 12/2007 Hatakeyama et al.
7,358,025 B2 4/2008 Hatakeyama
8,545,772 B2 10/2013 Kanigan et al.
8,658,050 B2 2/2014 Engelmann et al.
2012/0328488 A1 12/2012 Puntambekar et al.

OTHER PUBLICATIONS

Slack-Smith, R.J., "Fishing with Traps and Pots," FAO (Food and Agriculture Organizations of the United Nations), 2001.*
Stark, "Photodegradation and photostabilization of weathered wood flour filled polyethylene composites," Ph.D. dissertation, Michigan Technological University (2003).*
Kang, T. G., et al., "A continuous flow micro filtration device for plasma/blood separation using submicron vertical pillar gap structures," J. Micromech. Microeng., 24 (2014) 087001 (5pp).*
(Continued)

*Primary Examiner* — Chester T Barry
(74) *Attorney, Agent, or Firm* — Vazken Alexanian; Michael J. Chang, LLC

(57) ABSTRACT

Clog-resistant serpentine crossflow filters and blade loading structures for micro- and nano-fluidics are provided. In one aspect, a filter includes: a substrate; and at least one layer of pillars on the substrate, wherein the pillars are arranged adjacent to one another and groups of the pillars alternate between being perpendicular and parallel to a direction of fluid flow through the filter giving the filter a serpentine configuration having at least one downstream catch. A method of forming the filter as well as a system employing the filter in conjunction with a pillar sorting array and optionally a staged blade structure are also provided.

18 Claims, 6 Drawing Sheets

(56) References Cited

OTHER PUBLICATIONS

Hon, et al., "Characteristics of Free Radicals in Wood," Wood and Fiber (Summer 1980), vol. 12(2), p. 121-130.*

Sanatinia, R., et al., "Surface Second-Harmonic Generation from Vertical GaP Nanopillars," NanoLetters, pubs.acs.org/NanoLett, (2012), p. 820-826.*

Hon, D. N.-S., "Photooxidative Degradation of Cellulose: Reactions of eh Cellulosic Free radicals with Oxygen," Journal of Polymer Science: Polymer Chemistry Edition, vol. 17 , p. 441-454 (1979).*

Huang et al., "Continuous Particle Separation Through Deterministic Lateral Displacement," Science, vol. 304, pp. 987-990 (May 2004).

Cho et al., "New dry etching process of the deep contact composed of SiO2 and Si layer by using the triple hard mask system," 211th ECS Meeting, Abstract #815, May 2007 (1 page).

Ji et al., "Silicon-based microfilters for whole blood cell separation," Biomed Microdevices, 10(2):251-7 (Apr. 2008).

Wunderlich et al., "Microfluidic mixer designed for performing single-molecule kinetics with confocal detection on timescales from milliseconds to minutes," Nature Protocols, vol. 8, No. 8, pp. 1459-1474 (Jul. 2013).

Ryoo et al., "High-Aspect-Ratio Nanoscale Patterning in a Negative Tone Photoresist," Journal of Information and Communication Convergence Engineering, 13(1):56-61 (Mar. 2015).

D.F. Weston et al., "Fabrication of microfluidic devices in silicon and plastic using plasma etching," Journal of Vacuum Science & Technology B, vol. 19, No. 6, Nov./Dec. 2001, pp. 2846-2851.

D.R. Gossett et al., "Label-free cell separation and sorting in microfluidic systems," Analytical and Bioanalytical Chemistry, vol. 397, No. 8, Apr. 2010, pp. 3249-3267.

C. Wang et al., "Hydrodynamics of diamond-shaped gradient nanopillar arrays for effective DNA translocation into nanochannels," ACS Nano, vol. 9, No. 2, Jan. 2015, pp. 1206-1218.

* cited by examiner

Serpentine crossflow filter

Pillar sorting array

CLOG-RESISTANT SERPENTINE PILLAR FILTERS AND BLADED LOADING STRUCTURES FOR MICROFLUIDICS

FIELD OF THE INVENTION

The present invention relates to techniques for efficiently filtering bioentities in micro- or nano-fluidics, and more particularly, to clog-resistant serpentine crossflow filters and blade loading structures for micro- and nano-fluidics.

BACKGROUND OF THE INVENTION

Generally, microfilter designs used in lab-on-a-chip (LOC) or micro total analysis system (μTAS) platforms can be categorized into four groups, namely 1) Weir, 2) pillar, 3) crossflow, and 4) membrane filters. A comparison of these different filter types is provided in Ji et al., "Silicon-based microfilters for whole blood cell separation," Biomed Microdevices, 10(2):251-7 (April 2008) (hereinafter "Ji"). As indicated in Table 2 of Ji, a crossflow arrangement provides the highest efficiency in terms of its ability to pass red blood cells and trap white blood cells along with the greatest capacity to pass large volumes (see Table 1 of Ji), while the Weir and membrane filters are much more prone to clogging.

Gradient pillar array interfaces, an extension of the pillar-type filters, have also been found to be an effective means of pre-stretching DNA molecules. See, for example, U.S. Pat. No. 7,217,562 issued to Cao et al., entitled "Gradient Structures Interfacing Microfluidics and Nanofluidics, methods for Fabrication and Uses Thereof." Gradient pillar array interfaces have found enhanced utility in staged filtering where particles are screened incrementally by size from largest to smallest to improve filter lifetime. See, for example, Wunderlich et al., "Microfluidic mixer designed for performing single-molecule kinetics with confocal detection on timescales from milliseconds to minutes," Nature Protocols, vol. 8, no. 8, pgs. 1459-1474 (July 2013) (FIG. 1e shows a filter post array with rows of decreasing post separation). The primary problems with a pillar filter arrangement are area requirements, typically requiring wide reservoirs, and the fact that these filters form an abrupt entropic barrier that can lead to rapid fouling over the filter interface since pile up in one location rapidly leads to wide-spread clogging.

A key problem with the majority of these filter designs is that they utilize arrays of micro- or nanochannels of uniform width over some distance to filter particles which creates a large entropic barrier, leading even to filtering of particles that should be permitted to pass. This also makes the filters less efficient and more prone to clogging. This channel design is even utilized for many of the filters that are classified as pillar filters as well, where the pillars have a square geometry with a uniform gap between them. Other filters of the pillar-type refer to cylindrical pillars in a gradient arrangement. In this configuration, particle pill-up or fouling occurs at the interfaces between pillar arrays with dissimilar gap sizes and from the onset of a single interfacial clog a build-up along the interface rapidly propagates until useful fluidic flow ceases.

Therefore, improved micro- and nano-filter designs would be desirable.

SUMMARY OF THE INVENTION

The present invention provides clog-resistant serpentine crossflow filters and blade loading structures for micro- and nano-fluidics. In one aspect of the invention, a filter is provided. The filter includes: a substrate; and at least one layer of pillars on the substrate, wherein the pillars are arranged adjacent to one another and groups of the pillars alternate between being perpendicular and parallel to a direction of fluid flow through the filter giving the filter a serpentine configuration having at least one downstream catch. The filter may include multiple layers of the pillars on the substrate, wherein the pillars in a first layer are separated from each other by a gap G, wherein the pillars in a second layer are separated from each other by a gap G', wherein G>G', and wherein the first layer is located upstream in the direction of fluid flow through the filter from the second layer. Additional layers (of successively smaller gapped) pillars may also be employed along the direction of fluid flow, e.g., an additional layer(s) of pillars separated from each other by a gap G" (downstream from the first/second layer of pillars) wherein G>G'>G".

In another aspect of the invention, a method of forming a filter is provided. The method includes: patterning at least one layer of pillars on a substrate, wherein the pillars are arranged adjacent to one another and groups of the pillars alternate between being perpendicular and parallel to a direction of fluid flow through the filter giving the filter a serpentine configuration having at least one downstream catch.

In yet another aspect of the invention, a system is provided. The system includes: a filter having a substrate, and at least one layer of pillars on the substrate, wherein the pillars are arranged adjacent to one another and groups of the pillars alternate between being perpendicular and parallel to a direction of fluid flow through the filter giving the filter a serpentine configuration having at least one downstream catch; and a pillar sorting array downstream from the filter.

A more complete understanding of the present invention, as well as further features and advantages of the present invention, will be obtained by reference to the following detailed description and drawings.

DETAILED DESCRIPTION OF PREFERRED EMBODIMENTS

Figure 1:
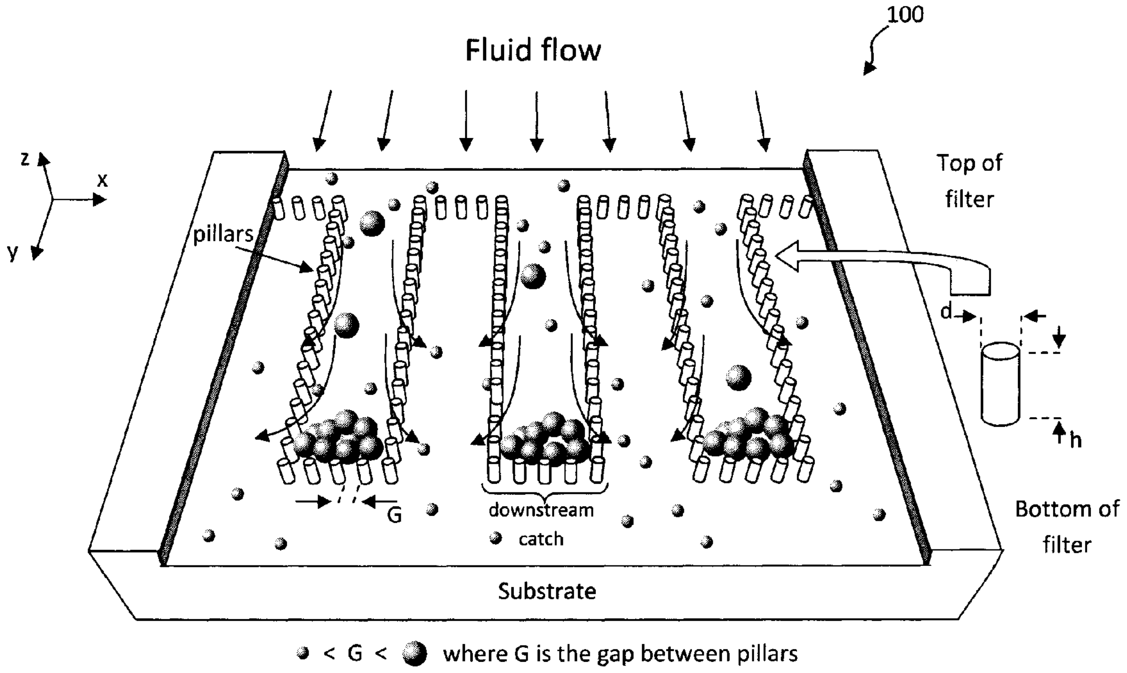
FIG. 1 is a diagram illustrating an exemplary serpentine crossflow filter according to an embodiment of the present invention.

Provided herein are structures for efficiently filtering bioentities in micro- or nano-fluidics. The present techniques can be applied to filtering and efficiently loading materials within a lab-on-a-chip (LOC) or micro total analysis system (μTAS) environment. The present filter design is unique both in terms of scale and its ability to minimize clogging. This is due to the neighbor-to-neighbor arrangement of the nanopillar design and serpentine architecture with at least one but preferably many downstream catches, which allow efficient lateral filtration long after total clogging or pileup has built up at the bottom of the downstream catch. This capability is important, as it is well understood in microfluidics that larger surface-to-volume ratios are more prone to nonspecific adsorption and surface fouling, a problem that is exacerbated when geometries are reduced to the nanoscale (which is needed for ultrafine filtering). Filtering at this scale is essential to enabling the longevity of on-chip technologies involving isolation and separation of biologically relevant nanomaterials such as exosomes, viruses, and deoxyribonucleic acid (DNA) to name a few. As will be described in detail below, these filters can be coupled with cascaded nanochannel blades. This provides a gradual increase in the entropic barrier and a staged increase in the velocity of the fluid prior to interfacing with high resistance features, such as pillar arrays for sorting, and further localizes surfacing fouling when it occurs.

Reference will be made herein to the present filters having a 'serpentine' design. By serpentine, it is meant that groups of the pillars in the filter design alternate between being adjacent to one another in planes perpendicular and parallel to the direction of fluid flow through the filter. This alternating pattern gives the filter its serpentine appearance. Reference will also be made herein to a 'staged' serpentine filter design. By staged, it is meant simply that at least two of the present serpentine filters are used in combination wherein, for example, they are configured to filter successively smaller particle sizes. As will be described in detail below, the present filters have a crossflow design. Namely, based on the direction of fluid flow through the filter, the filtrate passes tangentially through the filter (with the larger particles accumulating at the bottom of the filter in a downstream catch). Employing a crossflow design with downstream catch serves to greatly extend the life of the filter.

In the description that follows, the terms "micro" and "nano" are used to denote the relative sizes of features. By way of example only, feature sizes (such as channel width, pillar diameter, etc.) of from about 1 micrometers (μm) to about 50 μm, and ranges therebetween, may be considered 'micro' features, whereas feature sizes of from about 20 nanometers (nm) to about 500 nm, and ranges therebetween, may be considered 'nano' features.

The pillars used in the present filter are high-aspect ratio structures. By way of example only, the term 'high-aspect-ratio,' as used herein, refers to a pillar having diameter (d) to height (h) ratio of from about 1:3 to about 1:10, and ranges therebetween. See FIG. 1 (described below). According to an exemplary embodiment, the pillars have a diameter d of from about 100 nm to about 10 μm, and ranges therebetween, and a height h of from about 300 nm to about 100 μm, and ranges therebetween.

The present serpentine crossflow filter design 100 is depicted in FIG. 1. As shown in FIG. 1, the filter includes a plurality of cylindrical, high-aspect-ratio pillars on a substrate. As provided above, the arrangement of the pillars gives the filter its serpentine design. More specifically, reference to FIG. 1 illustrates that the pillars are arranged adjacent to one another in two different directions along the surface of the substrate. Starting, for example, from the left and moving right, the pillars are arranged adjacent to one another in the x-direction along the surface of the substrate. The direction then changes to where the pillars are arranged adjacent to one another in the y-direction along the surface of the substrate. The pillars then shift again in the x-direction, and so on. As shown in FIG. 1, the pillars extend up from the substrate in the z-direction, and the direction of fluid flow is along the y-direction. Thus, as a result of the above-described pillar arrangement, the pillars in the filter design alternate between being adjacent to one another in planes perpendicular and parallel to the direction of fluid flow through the filter. For illustrative purposes only, it is shown in FIG. 1 that the fluid flow begins at the top of the filter and flows (along the direction of fluid flow) generally towards the bottom of the filter. As such, it is notable that the pillars are arranged adjacent to one another in a continuous line, and that the pillars along the y-direction extend from the top of the filter to the bottom, and back, forming what is referred to herein as a 'downstream catch.'

As shown in FIG. 1, adjacent pillars in the filter are separated by a gap G (the same size gap G is present between each of the pillars). According to an exemplary embodiment, G is from about 20 nm to about 10 μm, and ranges therebetween. When a fluid sample containing a heterogeneous mixture of particles is introduced at the top of the filter 100 and the sample flows generally towards the bottom of the filter 100, the particles with a size greater than G travel to the bottom of the downstream catch where they are collected. This leaves the remainder of the filter free and unclogged to permit particles in the sample that are smaller than G to pass through the filter in a crossflow manner. Namely, as shown in FIG. 1, the smaller particles (less than G) pass tangentially through the pillars and out past the bottom of the filter.

Figure 2:
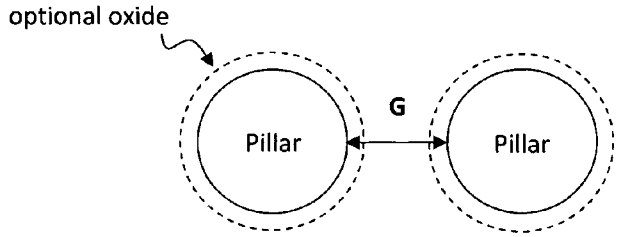
FIG. 2 is a schematic diagram illustrating a top-down view of two adjacent pillars which are separated from one another by a gap G according to an embodiment of the present invention.

The use of cylindrical pillars in the filter reduces the entropic barrier for the smaller particles (of a size less than G) to pass efficiently through the filter. See, for example, FIG. 2. FIG. 2 illustrates schematically a top-down view of two adjacent pillars which are separated from one another by a gap G. Because the pillars are cylindrical, the gap G only exists between two points for nearest neighbor pillars, i.e., the curved pillar surface reduces the entropic barrier for particles of a size less than G to pass efficiently. As shown in FIG. 2, an oxide coating may optionally be formed on the pillars which, as will be described in detail below, closes the gap G, and helps facilitate surface functionalization.

Figure 3:
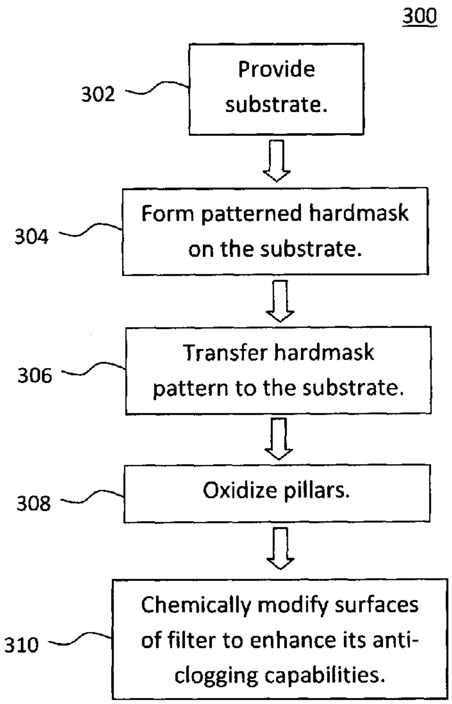
FIG. 3 is a diagram illustrating an exemplary methodology for forming the present serpentine crossflow filter according to an embodiment of the present invention.

FIG. 3 provides an exemplary methodology 300 for fabricating a serpentine crossflow filter according to the present techniques. The process begins in step 302 with a substrate. Suitable substrates include, but are not limited to, bulk semiconductor substrates, such as a bulk silicon (Si) wafer, Si-containing substrates such as Polydimethylsiloxane (PDMS), plastic substrates, etc.

The pillars and gaps are then defined in the substrate. To achieve high aspect ratio pillars, the pattern of the pillars is first created in a hardmask, followed by transferring the pattern to the substrate. Thus, in step 304 a patterned hardmask is formed on the substrate.

Several options exist for forming the patterned hardmask. For instance, a negative-tone nanoscale lithography technique can be used. See, for example, Ryoo et al., "High-Aspect-Ratio Nanoscale Patterning in a Negative Tone Photoresist," Journal of Information and Communication Convergence Engineering, 13(1):56-61 (March 2015), the contents of which are incorporated by reference as if fully set forth herein. Negative tone nanoscale lithography can be used to ensure a patterned gap size less than 100 nm. Electron-beam (e-beam) lithography is another option. E-beam lithography is an effective way to create patterns with sub-10 nm resolution. A more manufacturable approach of nanoimprint lithography can also be applied as well as deep ultraviolet (DUV) lithography under well controlled dose conditions.

According to an exemplary embodiment, e-beam lithography is employed in conjunction with a trilayer resist stack to pattern the hardmask with the location and footprint of the pillars. The use of a trilayer resist stack is described generally in U.S. Pat. No. 8,658,050 issued to Engelmann et al., entitled "Method to Transfer Lithographic Patterns Into Inorganic Substrates" (hereinafter "U.S. Pat. No. 8,658, 050"), the contents of which are incorporated by reference as if fully set forth herein. As described in U.S. Pat. No. 8,658,050, the trilayer structure can include an organic planarizing layer (OPL), a hardmask on the OPL, and a photoresist on the hardmask.

Suitable OPL materials include, but are not limited to, aromatic cross-linkable polymers. Other suitable OPLs include, but are not limited to, those materials described in U.S. Pat. No. 7,037,994 issued to Sugita et al. entitled "Acenaphthylene Derivative, Polymer, and Antireflection Film-Forming Composition," U.S. Pat. No. 7,244,549 issued to Iwasawa et al. entitled "Pattern Forming Method and Bilayer Film," U.S. Pat. No. 7,303,855 issued to Hatakeyama et al. entitled "Photoresist Undercoat-Forming Material and Patterning Process" and U.S. Pat. No. 7,358, 025 issued to Hatakeyama entitled "Photoresist Undercoat-Forming Material and Patterning Process." The contents of each of the foregoing patents are incorporated by reference as if fully set forth herein. A post-apply bake (e.g., at a temperature of from about 200° C. to about 250° C., and ranges therebetween) is performed. Suitable hardmask materials include, but are not limited to, a densified or undensified low temperature oxide (LTO), thermal oxide, or silicon-containing anti-reflective coating (SiARC). The photoresist can be an organic (e.g., aliphatic or aromatic) resist material. Alternatively, an inorganic resist can be employed, such as hydrogen silsesquioxane (HSQ), hafnium oxide ($HfO_2$)-based resists, or titanium oxide ($TiO_2$)-based resists. In either case, the resist can be patterned using e-beam lithography. Embodiments are also considered herein implementing a triple hardmask system including silicon nitride (SiN)-silicon dioxide ($SiO_2$)—SiN. See, for example, Cho et al., "New dry etching process of the deep contact composed of SiO2 and Si layer by using the triple hard mask system," $211^{th}$ ECS Meeting, Abstract #815, May 2007 (1 page), the contents of which are incorporated by reference as if fully set forth herein.

In step 306, the hardmask pattern is transferred to the substrate. According to an exemplary embodiment, step 306 is carried out using an anisotropic etching process, such as reactive ion etching (RIE). Following the etch, any remaining hardmask can be removed.

As provided above, the substrate (and hence the pillars) can be formed from silicon. In that case, after patterning, it may be beneficial in step 308 to oxidize the pillars (e.g., forming a layer of silicon dioxide ($SiO_2$) on the pillars) for a couple notable reasons. First, as will be described in detail below, surface chemical modification of the pillars may be employed. An $SiO_2$ surface is much easier to functionalize than Si (using silanes for example). Second, it is important to be able to control the size of the gap G between the pillars which is important for nanoscale particles in the range of from about 1 nm to about 100 nm, and ranges therebetween. Oxidation of the pillars thereby allows narrowing of the gap size. By way of example only, a thermal oxidation process may be used to oxidize the pillars. However, simply exposing the patterned Si pillars to an oxygen ambient will result in $SiO_2$ formation. It would be within the capabilities of one skilled in the art to tailor the conditions of the oxidation (e.g., temperature, duration, etc.) to achieve an oxide coating on the pillars of a given thickness (based, for example, on a desired gap G between the pillars).

Optionally, once formed, surface chemical modification of the pillars can be carried out in step 310 to enhance the anti-clogging capability of the filter. The notion here is that by modifying the surface properties of the pillars, one can avoid unwanted adsorption of particles to the pillar surfaces thereby preventing clogging of the filter. Namely, what is desired is for the smaller particles (i.e., those of a size less than G) to pass efficiently and effectively through the filter, and the larger particles (i.e., those of a size greater than G) to flow into the downstream catch. Any interaction between the pillar surfaces and the particles can, however, cause clumping and clogging of the filter. Thus, it may be desirable to modify the surface properties of the pillars to repel or be non-interacting with the analyte. The selection of the surface modification for the pillars can be made to tailor each filter to a specific application, for instance, using surface terminal groups that repel or are non-interacting with the analyte particulate.

Interaction between the particles to be sorted and the surfaces of the array can be tailored by using chemical modification. In general, this can involve the attachment or grafting of molecules to the surfaces of the array, either through physical adsoprtion, or the formation of chemical bonds. It can also include application of a layer(s) of material such as a metal, polymer, or ceramic coating, as well as changes to the oxidation state of the pillar surface.

Surfaces that can be chemically modified can include the areas of the pillars, the walls or ceiling or floors of the fluidic array, or any surfaces present in the inlets/outlets, drive mechanisms or other fluidic channels attached to the filter. Of greatest application is modification of the pillars themselves, as this allows design of the interactions between the particles with the filter pillar surfaces.

In one exemplary embodiment, a small organic molecule or polymer, termed a ligand, is chemically grafted to the surface of the pillars, such as through condensation of chlorosilane or alkoxysilanes on the pillars' native silicon oxide, or through thiols, amines or phosphines on pillars coated with a thin layer of platinoid metal, e.g., gold (Au), silver (Ag), or platinum (Pt). The resulting layer of ligand molecules is preferably a single molecule thick, i.e., a monolayer. The terminal groups of the monolayer, which are in direct contact with the fluid and particles, determine the physochemical interactions felt by the particles as they pass through the filter. Changing the terminal group of the ligand therefore allows tailoring of the surface interactions within the array. As examples, to make the surface hydrophobic and oleophilic, ligands with terminal alkyl or aryl groups (e.g. methyl, tert-butyl, cyclohexyl, benzyl) can be used, archetypes being a dodecanethiol monolayer on a gold coated pillar surface or a dodecyldimethylchlorosilane layer on a silicon oxide coated pillar. To produce quasi-omniphilic surfaces (both hydrophobic and oleophobic), fluorocarbon or fluorohydrocarbon terminal groups can be used, an archetype being a heptadecafluoro-1,1,2,2-tetrahydrodecyl)dimethylchlorosilane layer on a silicon oxide coated pillar.

It is notable that the steps of methodology 300 can be applied in the same manner described to form any of the structures described herein. For instance, the same processes are applicable to the present filter, staged filter/blade, and/or pillar sorting array designs described herein.

Figure 4A:
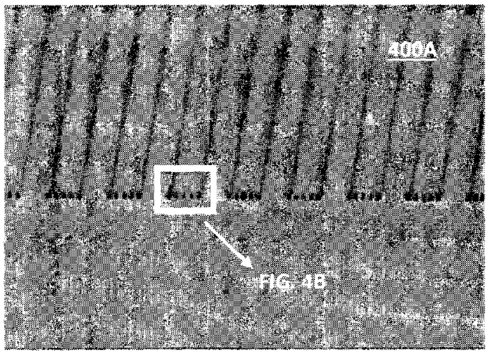
FIG. 4A is an image of a serpentine crossflow filter fabricated according to the present techniques having several columns of pillars and multiple downstream catches according to an embodiment of the present invention.
Figure 4B:
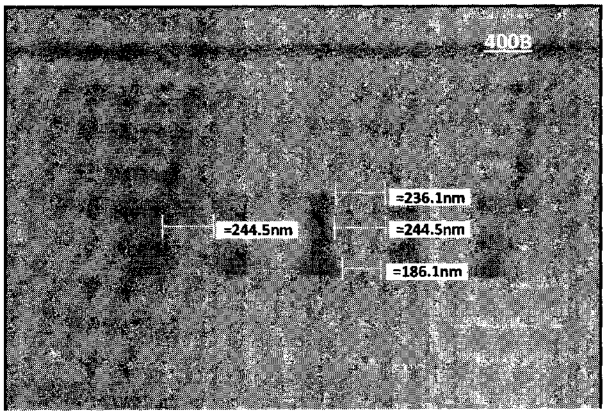
FIG. 4B is an enlarged image of one of the downstream catches from the filter of FIG. 4A according to an embodiment of the present invention.

FIGS. 4A and 4B are images of a serpentine crossflow filter fabricated according to the present techniques. Namely, the image 400A in FIG. 4A shows several columns of pillars which, as described above, make up the crossflow filter design, including multiple downstream catches which prevent clogging by larger particles that do not pass through the filter. FIG. 4B is an enlarged image 400B of one of the downstream catches.

In order to improve the filter lifetime, a staged serpentine filter design is contemplated herein. The same general techniques apply as to the above design, however here one or more additional layers of pillars (of a successively smaller size) are used along the direction of flow through the filter. See FIG. 5. Thus, as the sample flows through the filter, it encounters a first serpentine layer of pillars with a gap G between the pillars. The sample that flows through the first set of pillars then encounters another serpentine layer of pillars with a gap G' (wherein G>G') and so on. At each stage, the particles larger than G, G', etc. remain in the respective downstream catches. Filtering out successively smaller particles via this staged design lessens the likelihood of clogging and losing the desired finer particle sizes in the downstream catch. Further, it maximizes the use of space on the microfluidic chip when arranged in this configuration.

Figure 5:
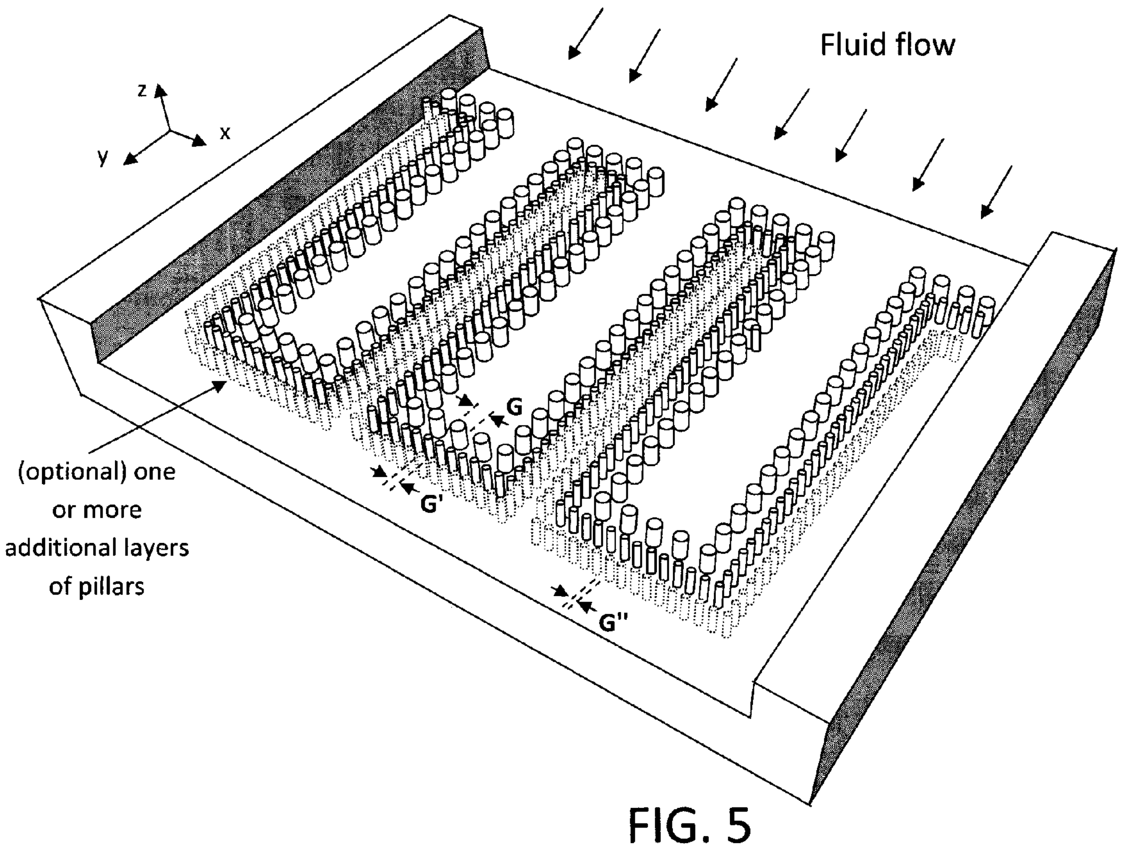
FIG. 5 is a diagram illustrating an exemplary staged serpentine crossflow filter according to an embodiment of the present invention.

The layout of the staged design shown in FIG. 5 is merely an example. For instance, more than two layers of pillars may be employed to add further stages to the filter, e.g., one or more other layer of pillars with a gap G", etc. wherein G>G'>G" (arranged in the same manner as shown in FIG. 5 where the sample flows through the first set of pillars with gap G, followed by the second set of pillars with gap G', then through the third set of pillars with gap G", and so on—see FIG. 5). Also, instead of placing multiple layers of pillars within the same filter (as shown in FIG. 5) one may instead create separate filters having successively finer gaps between the pillars. The finer filter(s) can be placed separately downstream from the coarser filter.

In an exemplary implementation, the present serpentine crossflow filters are used in a system to filter samples that are ultimately delivered to the sorting array. Micro- and nanopillar sorting arrays and principles for operation thereof are described, for example, in Huang et al., "Continuous Particle Separation Through Deterministic Lateral Displacement," Science, vol. 304 (May 2004), the contents of which are incorporated by reference as if fully set forth herein. Thus, for instance, one or more of the present serpentine crossflow filters can be located upstream of the sorting array, such that the sample particles that pass through the filter(s) are introduced into the sorting array. With high-density sorting arrays there is, however, the possibility of clogging as the particles flow into the array.

Figure 6:
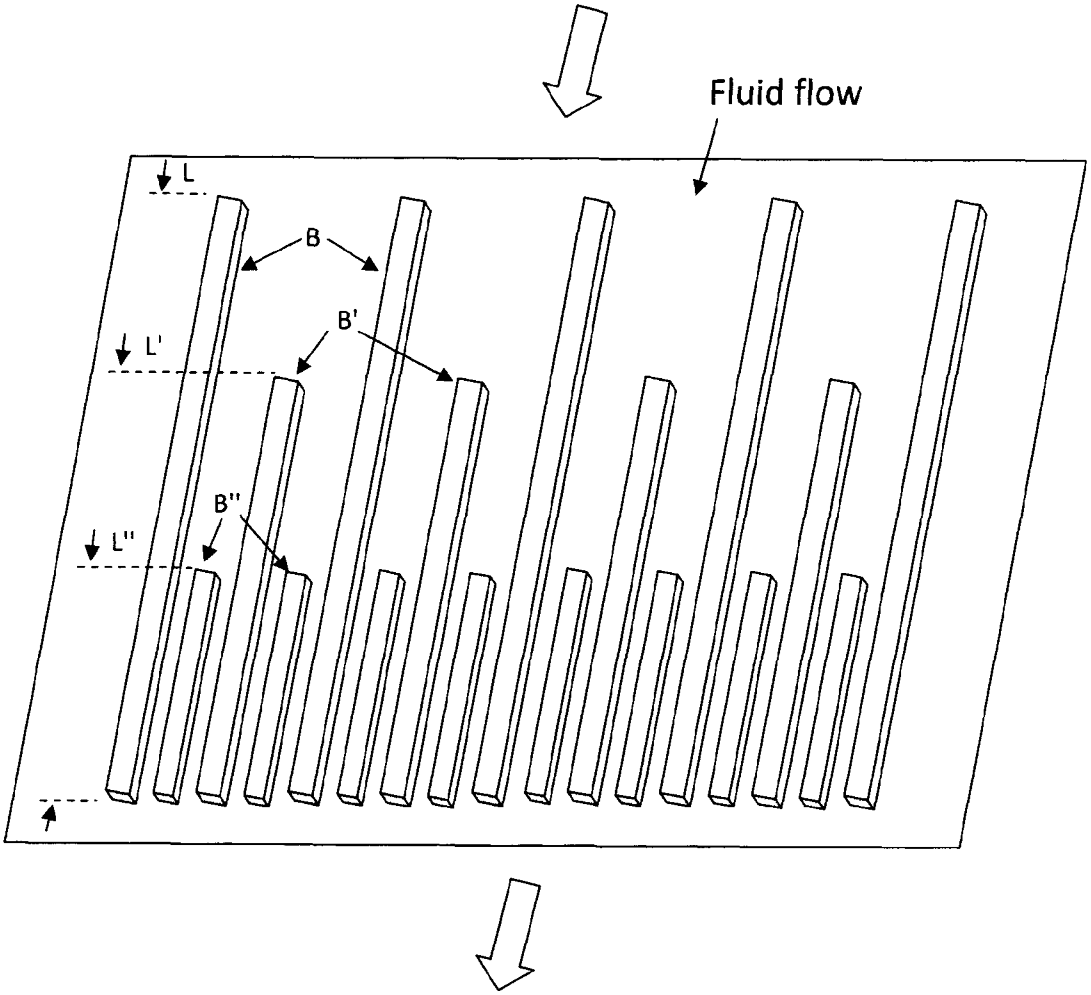
FIG. 6 is a diagram illustrating an exemplary staged blade structure according to an embodiment of the present invention.

According to the present techniques, a blade structure can be employed between the filter and the sorting array to 'soften' the impact of incoming particles at the interface of the sorting array, and thereby eliminating the rapid spread of surface fouling at the interface of the sorting array. The blade structure includes a plurality of blades defining sample channels therebetween. The blades run parallel to one another along the direction of fluid flow. According to an exemplary embodiment, the length of the blades is staged such that the sample passing between the blades (along the direction of fluid flow) encounters successively narrower channels as it gets closer to the sorting array. This is referred to herein as a "staged blade structure." By way of example only, the staged blade structure can include a first set of blades B having a first length L and a second set of blades B' having a second length L' in between the first set of blades B, wherein L>L'. The channels may be further narrowed through the use of a third set of blades B" having a third length L" in between the first set of blades B and the second set of blades B', wherein L>L'>L". See, for example, FIG. 6. As particles pass through the (successively narrower) channels they become collated into individual rows and are delivered to the sorting array in an ordered manner. When clogging does occur, the blades function to localize the clogging event to small region of the sorting array interface rather than allowing it to propagate across the entire width of the array.

As noted above, the staged blade structure may be fabricated by the same patterning steps described in accordance with methodology 300 of FIG. 3, above. Just in this case the process would be directed to patterning blade structures rather than pillars. If so desired, the above-described surface modification techniques can be employed to chemically modify the surfaces of the blades to enhance particle flow therethrough by repelling or non-interacting with the particles in the analyte.

Figure 7:
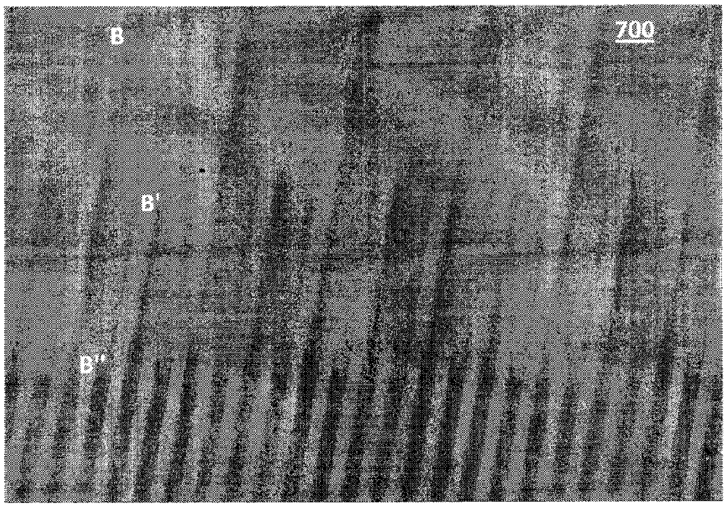
FIG. 7 is an image of a staged blade structure according to an embodiment of the present invention.
Figure 8:
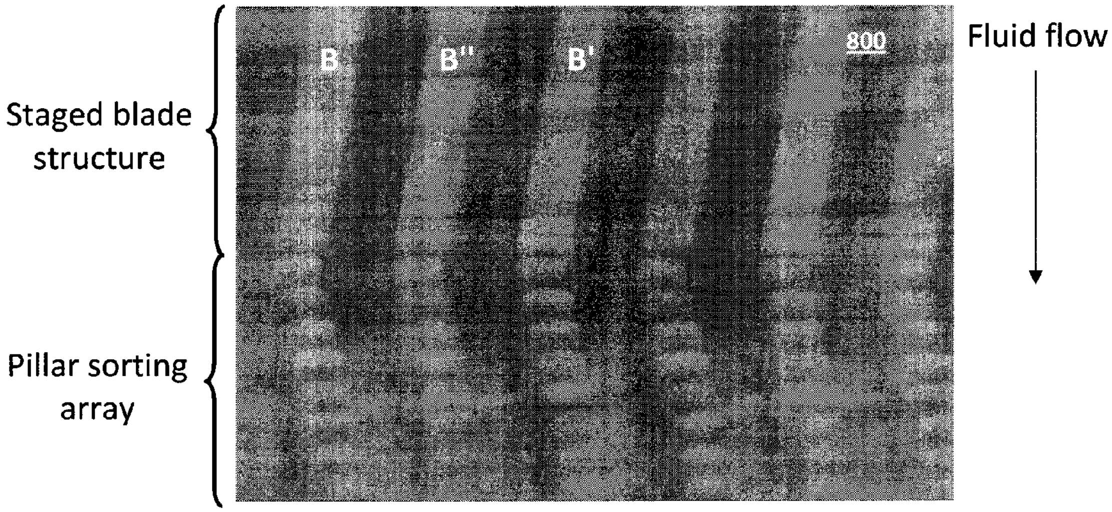
FIG. 8 is an image of the staged blade structure being placed upstream from a pillar sorting array according to an embodiment of the present invention.

FIG. 7 is an image 700 of a staged blade structure according to the present techniques. FIG. 8 is an image 800 of the staged blade structure being placed upstream from a pillar sorting array. As noted above, the present serpentine crossflow filter would be upstream from the staged blade structure. See, for example, FIG. 9.

Figure 9:
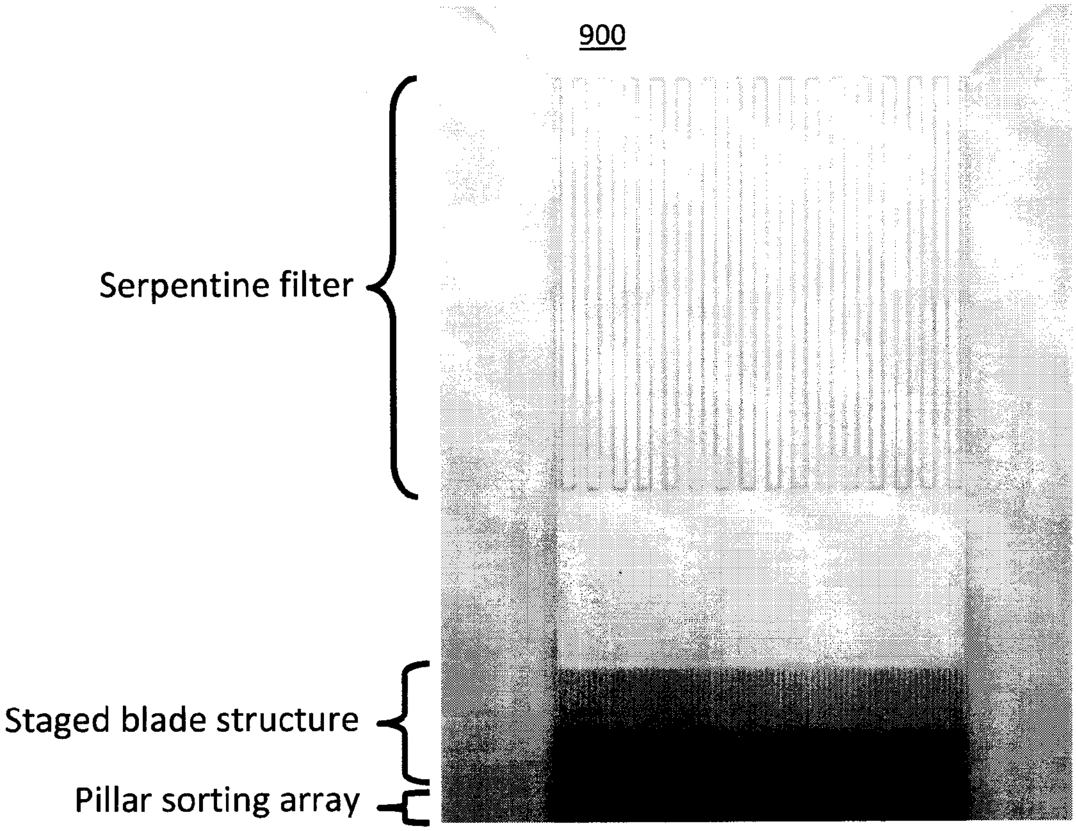
FIG. 9 is an image of a system employing the present clog-resistant (i.e., serpentine filter and blade loading) features according to an embodiment of the present invention.

FIG. 9 is an image 900 of a system employing the present clog-resistant features. As shown in image 900, along the direction of flow there is first the serpentine crossflow filter or filters (e.g., when using a stage filter design—see above), then the staged blade structure, and lastly the sorting pillar array. While optional, blade loading the sample into the pillar sorting array helps prevent clogging especially in the case of high-density sorting arrays. In tests using a high-density particle stream containing 110 nm-polystyrene beads and aggregates of the same, the system shown in FIG. 9 could be run for more than 5 hours before clogging completely.

The present techniques are further illustrated by way of reference to the following non-limiting example. A serpentine crossflow filter was fabricated in accordance with the present techniques by the following process: Dry etching was carried out in an Applied Materials DPSII ICP etch chamber for pattern transfer to fabricate 400 nm high Si pillars from the e-beam resist pattern. First, the negative tone e-beam resist was used to etch through a carbon hard mask using $N_2/O_2/Ar/C_2H_4$ chemistry at 400 Watt source power, 100 Watt bias power and 4 milliTorr pressure at 65° C. Then, the pattern was transferred further into a $SiO_2$ hardmask using $CF_4/CHF_3$ chemistry at 500 Watt source power, 100 Watt bias power and 30 milliTorr pressure at 65° C. The carbon hard mask was then stripped using $O_2/N_2$ chemistry in an Applied Materials Axiom downstream asher at 250° C.

Using the $SiO_2$ hardmask, Si pillars are etched to 400 nm depth using the DPS II by first a $CF_4/C_2H_4$ breakthrough step and then $Cl_2/HBr/CF_4/He/O_2/C_2H_4$ main etch at 650 Watt source power, 85 Watt bias power and 4 milliTorr pressure at 65° C.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A filter, comprising:

a substrate; and at least one layer of pillars on the substrate, wherein the pillars are arranged adjacent to one another and groups of the pillars alternate between being perpendicular and parallel to a direction of fluid flow through the filter giving the filter a serpentine configuration having at least one downstream catch, wherein a surface of the pillars is chemically modified, wherein a ligand is chemically grafted to the surface of the pillars, and wherein the ligand forms a monolayer on the surface of the pillars.

2. The filter of claim 1, wherein the pillars are separated from each other by a gap G.

3. The filter of claim 1, wherein G is from about 20 nm to about 10 μm, and ranges therebetween.

4. The filter of claim 1, wherein the pillars each have a diameter d of from about 100 nm to about 10 μm, and ranges therebetween, and a height of from about 300 nm to about 100 μm, and ranges therebetween.

5. The filter of claim 1, wherein the substrate comprises a semiconductor wafer.

6. The filter of claim 1, comprising multiple layers of the pillars on the substrate, wherein the pillars in a first layer are separated from each other by a gap G, wherein the pillars in a second layer are separated from each other by a gap G', wherein G>G', and wherein the first layer is located upstream in the direction of fluid flow through the filter from the second layer.

7. The filter of claim 6, further comprising a third layer located downstream in the direction of fluid flow from the first layer and the second layer, wherein the pillars in the third layer are separated from each other by a gap G", wherein G>G'>G".

8. A method of forming a filter, comprising the steps of:

patterning at least one layer of pillars on a substrate, wherein the pillars are arranged adjacent to one another and groups of the pillars alternate between being perpendicular and parallel to a direction of fluid flow through the filter giving the filter a serpentine configuration having at least one downstream catch; and chemically modifying a surface of the pillars to enhance anti-clogging capabilities of the filter.

9. The method of claim 8, wherein the chemically modifying step comprises:

chemically grafting a ligand to the surface of the pillars.

10. The method of claim 9, wherein the ligand forms a monolayer on the surface of the pillars.

11. The method of claim 8, further comprising the step of:

oxidizing the surface of the pillars before chemically modifying the surface of the pillars.

12. The method of claim 8, further comprising the step of:

patterning multiple layers of the pillars on the substrate, wherein the pillars in a first layer are separated from each other by a gap G, wherein the pillars in a second layer are separated from each other by a gap G', wherein G>G, and wherein the first layer is located upstream in the direction of fluid flow through the filter from the second layer.

13. A system, comprising:

a filter having a substrate, and at least one layer of pillars on the substrate, wherein the pillars are arranged adjacent to one another and groups of the pillars alternate between being perpendicular and parallel to a direction of fluid flow through the filter giving the filter a serpentine configuration having at least one downstream catch;

a pillar sorting array downstream from the filter; and a blade structure in between the filter and the pillar sorting array, wherein the blade structure comprises a plurality of blades.

14. The system of claim 13, wherein the filter comprises multiple layers of the pillars on the substrate, wherein the pillars in a first layer are separated from each other by a gap G, wherein the pillars in a second layer are separated from each other by a gap G', wherein G>G', and wherein the first layer is located upstream in the direction of fluid flow through the filter from the second layer.

15. The system of claim 13, wherein the blade structure is a staged blade structure with the blades defining successively narrowing channels between the filter and the pillar sorting array, wherein the blades run parallel to one another along the direction of fluid flow through the filter, and wherein a length of the blades is staged.

16. The system of claim 15, wherein the staged blade structure comprises:

a first set of blades B having a first length L; and a second set of blades B' having a second length L' in between the first set of blades B, wherein L>L'.

17. The system of claim 16, wherein the staged blade structure further comprises:

a third set of blades B" having a third length L" in between the first set of blades B and the second set of blades B', wherein L>L'>L".

18. The system of claim 13, wherein the pillars each have a diameter d of from about 100 nm to about 10 μm, and ranges therebetween, and a height of from about 300 nm to about 100 μm, and ranges therebetween.

* * * * *